United States Patent [19]

Swinford

[11] Patent Number: 5,560,407
[45] Date of Patent: Oct. 1, 1996

[54] DISPENSING TOOL ASSEMBLY FOR EVACUATING AND CHARGING A FLUID SYSTEM

[75] Inventor: Mark D. Swinford, Kettering, Ohio

[73] Assignee: Production Control Units, Inc., Dayton, Ohio

[21] Appl. No.: 420,098

[22] Filed: Apr. 11, 1995

[51] Int. Cl.⁶ .................................................. B65B 3/00
[52] U.S. Cl. .......................... 141/385; 141/59; 141/65; 141/67; 141/383; 141/21; 62/292; 137/625.66; 251/149.9; 285/315
[58] Field of Search .................................. 141/2–5, 7, 8, 141/18, 20, 21, 46, 54, 59, 65, 67, 25, 27, 348, 349, 383–386; 62/77, 292; 285/315; 137/625.66; 251/149.9

[56] References Cited

U.S. PATENT DOCUMENTS

| | | | |
|---|---|---|---|
| 4,526,406 | 7/1985 | Nelson | 285/315 X |
| 4,643,228 | 2/1987 | Spencer | 137/625.66 |
| 4,664,151 | 5/1987 | Piet | 137/625.66 |
| 4,805,417 | 2/1989 | Weaver et al. | 62/292 |
| 4,869,300 | 9/1989 | Gudeneau et al. | 141/59 |
| 4,889,149 | 12/1989 | Weaver et al. | 137/1 |
| 5,038,840 | 8/1991 | Fair | 141/383 X |

*Primary Examiner*—J. Casimer Jacyna
*Attorney, Agent, or Firm*—Jacox, Meckstroth & Jenkins

[57] ABSTRACT

A generally cylindrical body supports an outlet tube on which is mounted a resilient annular sealing member adapted to be inserted into the tubular inlet fitting of a liquid coolant system. The body also supports a set of arcuate collar sections which surround the sealing member and are cammed inwardly for gripping external threads on the inlet fitting in response to axial movement of a first air actuated annular piston surrounding the outlet tube. The sealing member is expanded radially outwardly into sealing engagement with the inlet fitting in response to axial movement of a second air actuated annular piston confined between the outlet tube and the first piston. A tubular valve member is supported for axial movement within the body in alignment with the outlet tube and moves in response to a third air actuated annular piston for selectively connecting the passage within the outlet tube to a suction passage for evacuating the coolant system and then to a liquid supply passage for filling the system.

18 Claims, 2 Drawing Sheets

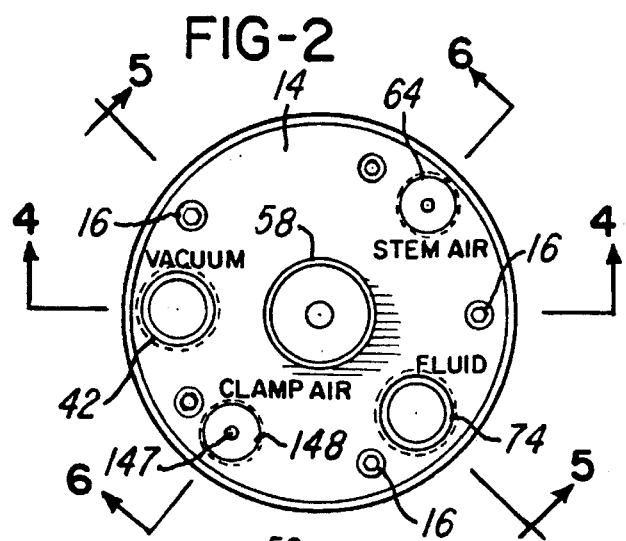
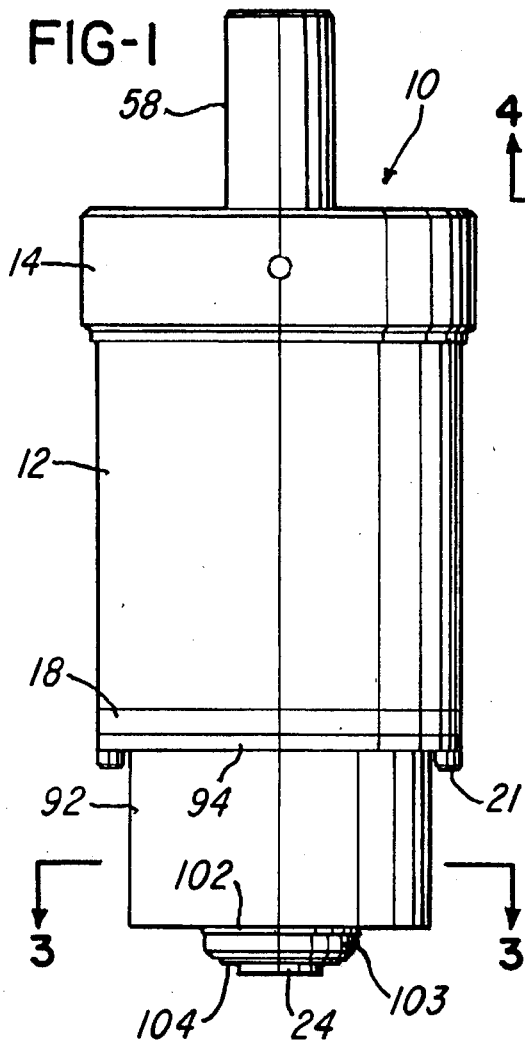
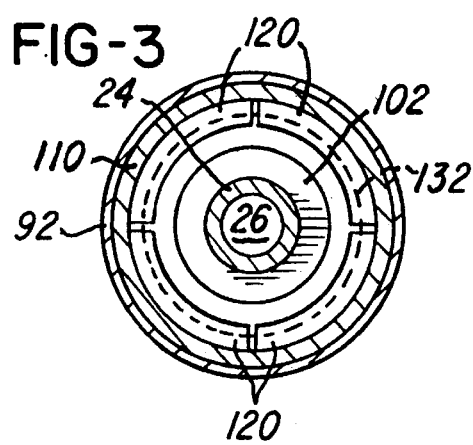
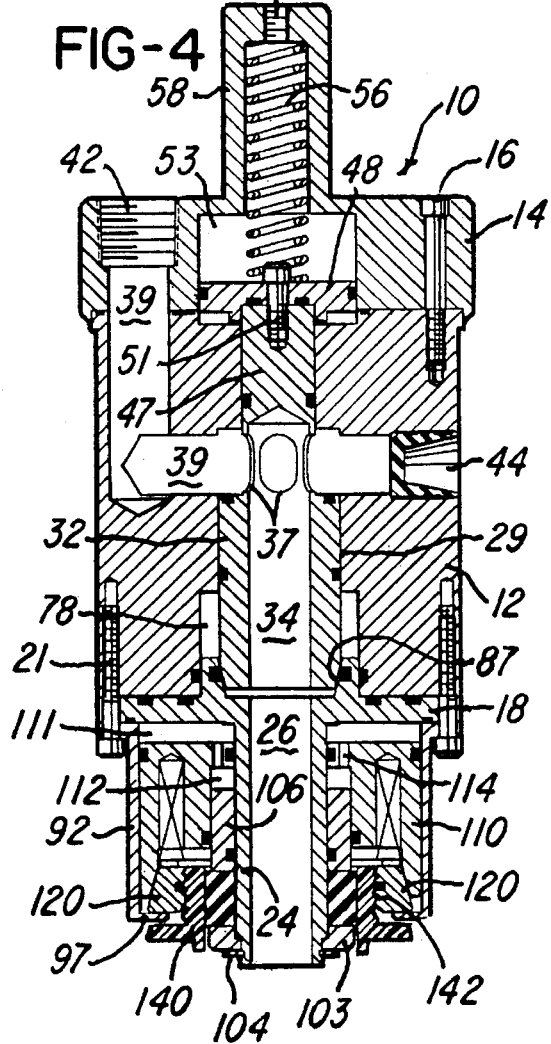

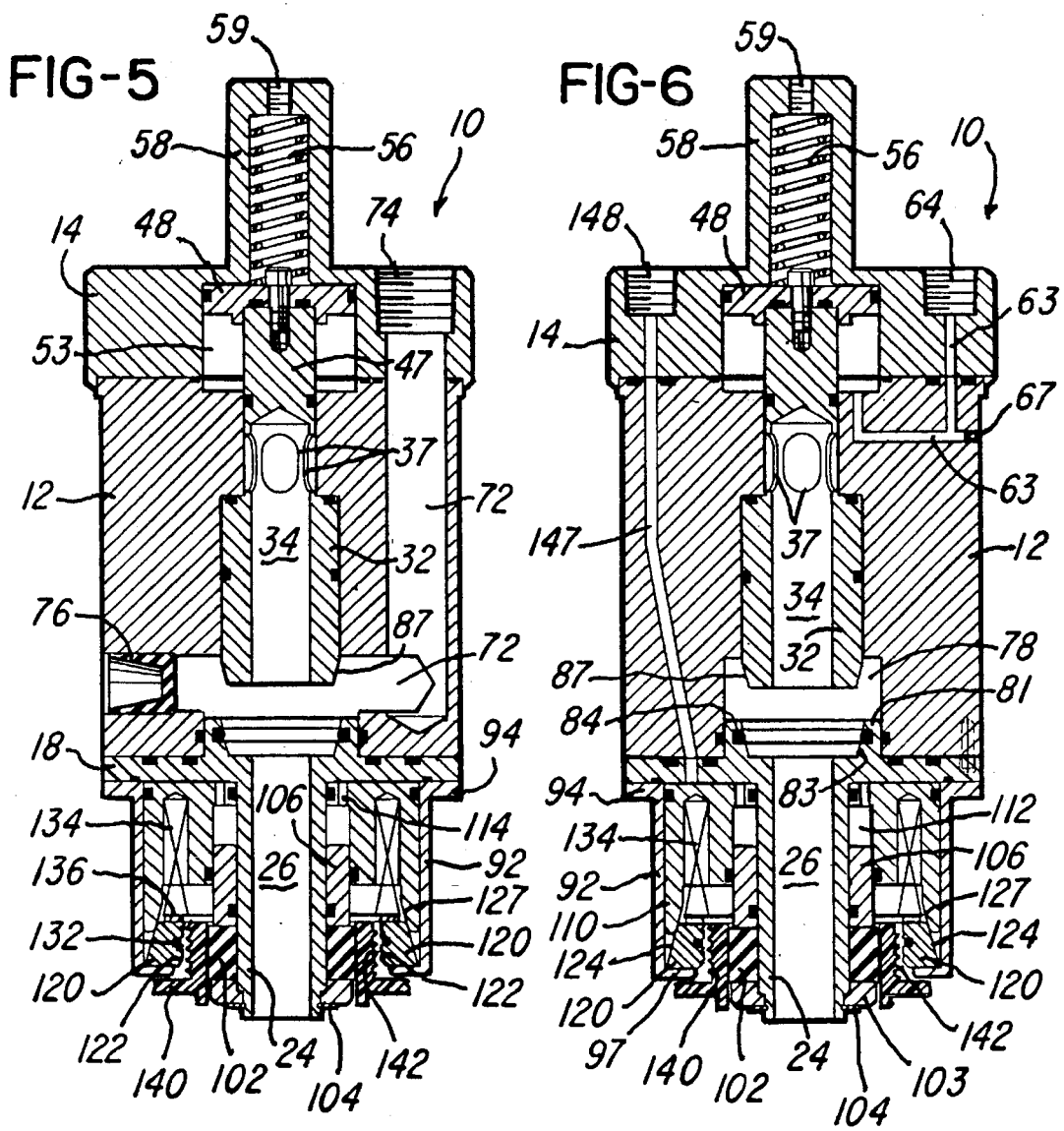

DISPENSING TOOL ASSEMBLY FOR EVACUATING AND CHARGING A FLUID SYSTEM

BACKGROUND OF THE INVENTION

In the art of dispensing tool assemblies of the general type disclosed in Pat. No. Reissue 34,426 and U.S. Pat. No. 4,889,149 issued to the assignee of the present invention, it is sometimes desirable to construct a tool assembly for evacuating and charging a liquid receiving system such as a liquid coolant system for an internal combustion engine. One form of liquid charging tool assembly is disclosed in connection with FIGS. 11–14 of above-mentioned U.S. Pat. No. 4,889,149. This tool assembly is adapted to be connected to an inlet fitting for a radiator of an engine coolant system in place of the radiator cap for first evacuating air and moisture from the system and then charging the system with a predetermined volume of liquid coolant. As shown in FIG. 13 of the '149 patent, the tool assembly incorporates a set of annular pistons for clamping on and sealing with the radiator inlet fitting and also for operating a valve within the center outlet passage. Another form of a fluid or refrigerant charging tool assembly is disclosed in U.S. Pat. No. 4,869,300. This tool assembly incorporates a pair of cam actuated arcuate ring sections for securing or clamping the tool assembly to a Schrader type valve stem.

SUMMARY OF THE INVENTION

The present invention is directed to an improved dispensing tool assembly which is ideally suited for evacuating and charging a liquid receiving system such as a coolant system having a tubular inlet fitting with external threads for receiving an internally threaded closure or cap. The dispensing tool of the invention is also compact and simple in construction, dependable in operation and substantially minimizes the number of components required for quickly and positively gripping and sealing with the tubular inlet Fitting of the liquid receiving system as well as quickly releasing the inlet fitting.

In accordance with one embodiment of the invention, a dispensing tool assembly includes a stepped cylindrical body formed in three sections and including an outlet tube which carries a resilient annular sealing member confined between a retaining flange and an annular inner piston mounted for axial movement on the outlet tube. A set of arcuate collar sections surround the sealing member and are cammed inwardly in response to axial movement of an outer piston which surrounds the inner piston. A tubular valve member is supported for axial movement within the body in alignment with outlet tube and selectively connects the outlet tube passage to a suction passage or a liquid supply passage within the body in response to axial movement of a connected air actuated piston.

The dispensing tool assembly of the invention is coupled to a tubular inlet fitting of a liquid receiving system by inserting the outlet tube and the annular sealing member into the tubular inlet fitting. The inner and outer pistons are then actuated by pressurized air for expanding the sealing member against the inner surface of the inlet fitting and camming the collar sections into engagement with threads on the outer surface of the inlet fitting. After the liquid receiving system is evacuated of air and moisture, the tubular valve member within the tool body is shifted axially by pressurized air to close the evacuation or suction passage and open the liquid supply passage for filling or charging the system with liquid.

Other features and advantages of the invention will be apparent from the following description, the accompanying drawings and the appended claims.

BRIEF DESCRIPTION OF THE DRAWINGS

FIG. 1 is an elevational view of a dispensing tool assembly constructed in accordance with the invention;

FIG. 2 is a top view of the tool assembly shown in FIG. 1;

FIG. 3 is a radial section taken generally on the line 3—3 of FIG. 1;

FIG. 4 is an axial section taken generally on the line 4—4 of FIG. 2;

FIG. 5 is an axial section taken generally on the line 5—5 of FIG. 2; and

FIG. 6 is an axial section taken generally on the line 6—6 of FIG. 2.

DESCRIPTION OF THE PREFERRED EMBODIMENT

A dispensing tool assembly 10 includes a generally cylindrical tubular body 12 having a top end closed by a manifold cap member 14 secured to the body by a series of five circumferentially spaced screws 16. The bottom end of the body 12 is covered or closed by a closure member 18 secured to the body 12 by a set of four circumferentially spaced screws 21 and including a tubular outlet portion or cylindrical outlet tube 24 defining a cylindrical outlet passage 26.

Referring to FIGS. 4–6, the body 12 has a stepped cylindrical bore 29 having a common center axis with the body 12, and a stepped cylindrical valve member 32 is supported within the bore 29 for axial movement between a normal first position (FIG. 4) and a retracted second position (FIGS. 5 and 6). The valve member 32 has an axially extending suction passage 34 which aligns with the outlet passage 26 and is connected by four circumferentially spaced ports 37 to an L-shaped suction passage 39 within the body 12. The suction passage 39 extends upwardly to a threaded port 42 within the cap member 14, and the port 42 is adapted to receive a flexible vacuum or suction line (not shown) extending from a vacuum pump (not shown). A cup-like plug 44 or "Lee Plug" is inserted into the opposite end of the suction passage 39 for closing the passage.

The valve member 32 has an upper end portion 47 which is secured to an annular piston 48 by a center screw 51. The piston 48 is confined for axial movement within a cylindrical chamber 53 formed within the cap member 14, and a compression spring 56 extends upwardly from the piston 48 into a tubular portion 58 formed as an integral part of the cap member 14. A vent opening 59 is formed within the upper end of the tubular portion 58, and a U-shaped air passage 63 (FIG. 6) extends from the lower end of the chamber 53 to a threaded inlet port 64 (FIGS. 2 and 6) formed within the cap member 14. The port 64 connects with a flexible pressurized air supply line (not shown) extending from a pressurized air source such as an air compressor. A plug 67 (FIG. 6) or "Lee Plug" closes the outer end of a radially extending portion of the air passage 63, and a series of resilient O-rings (shown in cross-section by black dots) form fluid-tight seals between the body 12 and the cap member 14, between the piston 48 and the cap member 14 and between the valve member 32 and the body 12.

Referring to FIG. 5, an L-shaped liquid supply passage 72 is also formed within the body 12 and has an upper end connected to a threaded port 74 formed within the cap member 14. The port 74 connects with a flexible liquid supply line (not shown) extending from a fluid or liquid supply source such as a pressurized source of a glycol-water coolant mixture. The opposite end of the liquid supply passage 72 is closed by a plug 76 or another "Lee Plug" which is pressed into the outer end portion of the passage 72.

The lower radially extending leg or portion of the passage 72 intersects with a cylindrical chamber 78 (FIGS. 5 and 6) formed within the bottom center of the body 12, and the bottom closure member 18 includes an annular portion 81 which projects upwardly into the chamber 78 and defines a tapered or frusto-conical valve seat 83 having an internal groove for retaining a resilient O-ring 84. A correspondingly tapered annular surface 87 is formed on the lower end of the valve member 32 and engages the O-ring 84 to form a fluid-tight seal when the valve member moves downwardly to a liquid closed position (FIG. 4) in response to the force exerted by the compression spring 56.

When the valve member 32 is in the closed position (FIG. 4), the suction passage 34 within the valve member connects the outlet passage 26 to the suction passage 39 and seals off or closes the liquid supply passage 72. When the valve member 32 is shifted to its retracted or upper position (FIGS. 5 and 6) in response to pressurized air on the bottom of the piston 48, the suction passage 39 is closed by the valve member 32, and the liquid supply passage 72 is connected with the outlet passage 26.

A generally cylindrical housing 92 forms an extension of the body 12 and includes an outwardly projecting upper flange 94 which is secured to the body 12 by the four screws 21 which also secure the closure member 18 to the body. The housing 92 surrounds the outlet tube 24 and includes an inwardly projecting bottom or lower flange 97. A resilient annular sealing tube or member 102 is mounted on the outlet tube 24 and seats on an annular washer 103 secure to the outlet tube by a spring retaining ring 104. A cylindrical or tubular piston 106 is also mounted on the outlet tube for axial movement adjacent the upper end of the sealing member 102. An annular outer piston 110 is supported for axial movement within a chamber 111 defined between the housing 92 and the outlet tube 24 and cooperates with the outlet tube 24 to define a chamber 112 for receiving the inner piston 106. A set of four axially extending ports 114 (FIG. 4) connect the chamber 112 to the chamber 111 which receives the outer piston 110.

A set of four arcuate gripping jaws or collar sections 120 (FIGS. 3 and 4) are supported by the lower flange 97 of the housing 92 for movement in corresponding radial directions. Each of the arcuate sections 120 has inner threads 122 (FIG. 5), and the threads on each section mate with the threads on the adjacent sections so that the four sections form one continuous helical thread when the sections are moved inwardly to a gripping position as shown in FIGS. 3 and 4.

Each of the arcuate collar sections 120 has a tapered outer surface 124 which mates with a tapered annular surface 127 on a lower annular portion of the outer piston 110. A spring wire expansion spring 132 urges the collar sections 120 radially outwardly against the housing 92. A set of eight axially extending and circumferentially spaced compression springs 134 are confined within corresponding holes within the outer piston 110, and the lower ends of the springs 134 seat upon a flat annular washer 136 which engages the top surfaces of the collar sections 120. As shown in FIGS. 4–6, a series of resilient O-rings (shown in cross-section as black dots) form fluid-tight seals between the inner piston 106, the outer piston 110, the inner surface of the housing 92 and the outer surface of the outlet tube 24.

When it is desired to use the dispensing tool assembly 10 to evacuate a fluid system such as an engine cooling system (not shown) having a projecting tubular inlet fitting 140 (FIGS. 5 and 6) with external threads 142, the tool assembly 10 is lowered until the outlet tube 24 and sealing member 102 are inserted into the tubular inlet fitting 140 with slight clearance. In this position, the arcuate clamping jaws or collar sections 120 are retracted outwardly by the expansion spring 132, as shown in FIGS. 5 and 6.

Pressurized air is then supplied to the annular chamber 111 through a passage 147 (FIG. 6) extending through the body 12 from an internally threaded port 148 formed within the manifold cap member 14 and connected to a source of pressurized air. The pressurized air within the chamber 111 on top of the outer piston 110 moves the piston downwardly so that the collar sections 120 are cammed inwardly until the internal threads 122 on the collar sections 120 engage the external threads 142 on the inlet fitting 140. This forms a positive coupling of the tool assembly 10 to the inlet fitting 140.

The pressurized air within the annular chamber 111 also passes through the ports 114 and into the annular chamber 112 and forces the inner piston 106 downwardly to compress the resilient sealing member 102 axially. This causes the sealing member to expand radially outwardly to form a fluid-tight seal with the inner cylindrical surface of the inlet fitting 140. The cooling system is then evacuated by partial vacuum or suction within the passages 26, 34 and 39. After the evacuation, pressurized air is introduced into the bottom of the chamber 53 through the passage 63 in order to pressurize the bottom surface of the annular piston 48. This moves the valve member 32 upwardly against the compression spring 56 so that the suction passage 39 is closed and the liquid supply passage 72 is open to the outlet passage 26 (FIG. 5). After a predetermined volume of the liquid coolant is supplied to the fluid receiving or cooling system, the chamber 53 is exhausted and the valve member 32 returns to the normal evacuation position shown in FIG. 4, thereby closing the liquid supply passage 72 to the outlet passage 26. The pressurized air passage 147 and chamber 111 are exhausted so that the air pressure on the inner piston 106 and the outer piston 110 is released. The pistons then return to their upper retracted positions with the aid of the compression springs 134. The tool assembly 10 is thereby uncoupled with the inlet fitting 140 and may be automatically or manually removed from the fitting 140.

From the drawings and the above description, it is apparent that a dispensing tool assembly constructed in accordance with the invention provides desirable features and advantages. For example, the cam actuated gripping jaws or collar sections 120 form a positive coupling of the tool assembly 10 to an externally threaded inlet fitting 140, and the expandable sealing member 102 simultaneously forms a positive fluid-tight seal with the inner surface of the inlet fitting 140. The inner piston 106 and outer piston 110 also provide for quickly gripping and sealing with the inlet fitting 140 as well as quickly releasing and unsealing with the inlet fitting. Thus the time required for coupling and uncoupling is minimized, which is especially desirable when the tool assembly 110 is used for evacuating and charging a continuous series of fluid receiving systems moving along an assembly line. The tool assembly 10 is also simple in construction and may be quickly assembled during production as well as quickly disassembled during repair or servicing. In addition, the construction of the tool assembly provides for making a compact tool assembly, which is frequently desirable for charging an engine coolant system on a motor vehicle assembly line:

While the form of tool assembly herein described constitutes a preferred embodiment of the invention, it is to be understood that the invention is not limited to this precise form of tool assembly, and that changes may be made therein without departing from the scope and spirit of the invention as defined in the appended claims.

The invention having thus been described, the following is claimed:

1. A dispensing tool assembly for connecting a liquid charging unit to a liquid receiving system having a tubular inlet fitting with inner and outer surfaces, said tool assembly comprising a body having a center axis and means forming an axially extending outlet tube defining an outlet passage, a resilient annular sealing member mounted on said outlet tube and movable between a collapsed position for insertion into the inlet fitting with said outlet tube and a radially outwardly expanded position for engaging the inner surface of the inlet fitting to form a seal, gripping means disposed around said sealing member and supported for generally radial movement between an inward gripping position engaging the outer surface of the inlet fitting and a retracted released position, said body defining a suction passage for evacuating the system and a liquid supply passage for filling the system, movable valve means within said body for selectively connecting said suction passage and said liquid supply passage to said outlet passage, means including a first fluid actuated piston positioned for moving said gripping means between said gripping and released positions in response to axial movement of said first piston, means including a second fluid actuated piston positioned for moving said sealing member between said retracted and expanded positions in response to axial movement of said second piston, and means defining passages within said body for directing pressurized fluid to said first and second pistons.

2. A tool assembly as defined in claim 1 wherein said first piston surrounds said second piston and receives said second piston for relative axial sliding movement.

3. A tool assembly as defined in claim 1 where in said gripping means comprise a plurality of circumferentially disposed arcuate gripping elements, and cam means on said first piston for moving said gripping elements inwardly to said gripping position in response to axial movement of said first piston.

4. A tool assembly as defined in claim 1 wherein said gripping means comprise gripping elements having internal threads for engaging external threads on the outer surface of the inlet fitting.

5. A tool assembly as defined in claim 1 wherein said movable valve means within said body comprises a tubular valve member supported for axial movement in alignment with said outlet tube and defining a passage, said valve member positioned for alternately opening and closing said suction passage and said liquid supply passage, and a third fluid actuated piston connected to move said valve member.

6. A tool assembly as defined in claim 1 wherein said suction passage and said liquid supply passage include axially spaced portions within said body, and said valve means comprise a tubular valve member supported for axial movement within said body between a first position closing said liquid supply passage and connecting said suction passage to said outlet passage and a second position closing said suction passage and connecting said liquid supply passage to said outlet passage.

7. A tool assembly as defined in claim 6 and including a third fluid actuated piston connected to move said valve member.

8. A tool assembly as defined in claim 1 and including an annular collar secured to said outlet tube, said second piston is mounted on said outlet tube for axial movement, and said sealing member is mounted on said outlet tube between said collar and said second piston.

9. A tool assembly as defined in claim 8 wherein said first piston surrounds said outlet tube and said second piston.

10. A tool assembly as defined in claim 9 and including a plurality of axially extending compression springs within said first piston for urging said first piston and said gripping means to said released position.

11. A dispensing tool assembly for connecting a liquid charging unit to a liquid receiving system having a tubular inlet fitting with inner and outer surfaces, said tool assembly comprising a body having a center axis and means forming an axially extending outlet tube defining an outlet passage, a resilient annular sealing member mounted on said outlet tube and movable between a collapsed position for insertion into the inlet fitting with said outlet tube and a radially outwardly expanded position for engaging the inner surface of the inlet fitting to form a seal, a set of gripping elements disposed around said sealing member and supported for generally radial movement between an inward gripping position engaging the outer surface of the inlet fitting and a retracted released position, said body defining a suction passage for evacuating the system and a liquid supply passage for fill ing the system, movable valve means within said body for selectively connecting said suction passage and said liquid supply passage to said outlet passage, a first fluid actuated annular piston surrounding said outlet tube and having means for camming said gripping elements from said released position to said gripping position in response to axial movement of said first piston, a second fluid actuated annular piston mounted on said outlet tube within said first piston for axially compressing said sealing member to expand said sealing member from said retracted position to said expanded position in response to axial movement of said second piston, and means defining a passage within said body for directing pressurized fluid to said first and second pistons.

12. A tool assembly as defined in claim 11 wherein said gripping elements have internal threads for engaging external threads on the outer surface of the inlet fitting.

13. A tool assembly as defined in claim 11 wherein said movable valve means within said body comprises a tubular valve member supported for axial movement in alignment with said outlet tube and defining a passage, said valve member positioned and connected for alternately opening and closing said suction passage and said liquid supply passage, and a third fluid actuated piston connected to move said valve member.

14. A tool assembly as defined in claim 1 wherein said suction passage and said liquid supply passage include axially spaced portions within said body, and said valve means comprise a tubular valve member supported for axial movement within said body between a first position closing said liquid supply passage and connecting said suction passage to said outlet passage and a second position closing said suction passage and connecting said liquid supply passage to said outlet passage.

15. A tool assembly as defined in claim 14 and including a third fluid actuated piston connected to move said valve member.

16. A tool assembly as defined in claim 11 and including an annular collar secured to said outlet tube, and said sealing member is mounted on said outlet tube between said collar and said second piston.

17. A dispensing tool assembly for connecting a liquid charging unit to a liquid receiving system having an inlet fitting, said tool assembly comprising a body having a center axis and including a portion forming an axially extending outlet passage, a resilient annular sealing member supported by said body portion, gripping means disposed around said body portion and supported for generally radial movement between an inward gripping position engaging the inlet fitting and a retracted released position, said body defining a suction passage for evacuating the system and an axially spaced liquid supply passage for filling the system, a tubular valve member within said body and defining a center passage in axial alignment with said outlet passage, said valve member supported by said body for axial movement between a first position closing said liquid supply passage and connecting said suction passage to said outlet passage and a second position closing said suction passage and connecting said liquid supply passage to said outlet passage, means including a first fluid actuated piston positioned for moving said gripping means between said gripping and released positions in response to axial movement of said first piston, means including a second fluid actuated piston positioned for moving said valve member between said first and second positions in response to axial movement of said second piston, and means defining passages within said body for directing pressurized fluid to said first and second pistons.

18. A tool assembly as defined in claim 17 wherein said tubular valve member has a tapered annular end surface, and said body defines a tapered annular valve seat for receiving said end surface in one of said positions of said valve member.

* * * * *

UNITED STATES PATENT AND TRADEMARK OFFICE
CERTIFICATE OF CORRECTION

PATENT NO. 5,560,407
DATED : October 1, 1996
INVENTOR(S) : Mark D. Swinford

It is certified that error appears in the above-indentified patent and that said Letters Patent is hereby corrected as shown below:

Column 1, line 39, delete "Fitting" and insert --fitting--.

Claim 1, column 5, line 25, delete "between-an" and insert --between an--

Claim 3, column 5, line 44, delete "where in" and insert --wherein--.

Claim 14, column 6, line 56, delete "1" and insert --11--.

Signed and Sealed this

Seventeenth Day of December, 1996

Attest:

BRUCE LEHMAN

*Attesting Officer*     *Commissioner of Patents and Trademarks*